C. H. BEDELL.
PERISCOPE.
APPLICATION FILED DEC. 15, 1917.
1,361,358.
Patented Dec. 7, 1920.
2 SHEETS—SHEET 1.
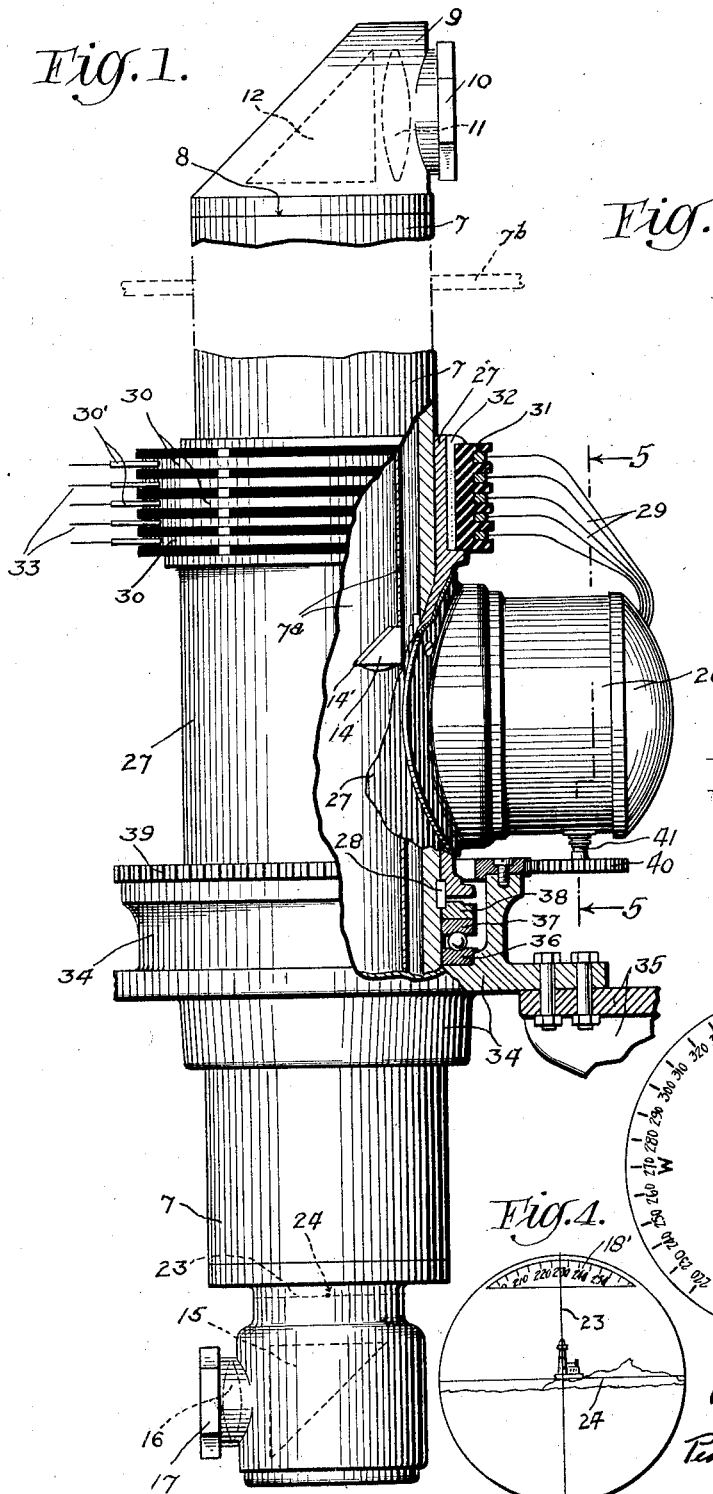
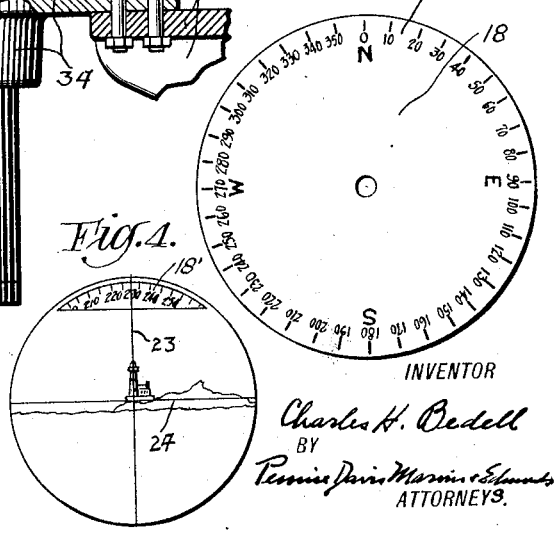
INVENTOR
Charles H. Bedell
BY
Pennie Davis Marvin & Edmonds
ATTORNEYS.

C. H. BEDELL.
PERISCOPE.
APPLICATION FILED DEC. 15, 1917.

1,361,358.

Patented Dec. 7, 1920.
2 SHEETS—SHEET 2.

Inventor
Charles H. Bedell
By his Attorneys

UNITED STATES PATENT OFFICE.

CHARLES H. BEDELL, OF GROTON, CONNECTICUT, ASSIGNOR TO ELECTRIC BOAT COMPANY, OF NEW YORK, N. Y., A CORPORATION OF NEW JERSEY.

PERISCOPE.

1,361,358.  Specification of Letters Patent.  Patented Dec. 7, 1920.

Application filed December 15, 1917. Serial No. 207,270.

*To all whom it may concern:*

Be it known that I, CHARLES H. BEDELL, a citizen of the United States, residing at Groton, in the county of New London, State of Connecticut, have invented certain new and useful Improvements in Periscopes; and I do hereby declare the following to be a full, clear, and exact description of the invention, such as will enable others skilled in the art to which it appertains to make and use the same.

This invention relates to improvements in periscopes in which the image of an observed object is produced in conjunction with an image of a compass scale in such relation as to indicate the direction of the object from the vessel equipped with the periscope.

In my prior Patent No. 1,043,562, issued to me on November 5, 1912, I have disclosed a periscope of this character in which the compass was arranged at the top of the periscope above the objective prism, the periscope being equipped with suitable optical elements to project a view of a portion of the compass scale into the field of view through the periscope.

In the improved structure of my present application, I have removed the compass from the top of the periscope where the space is necessarily limited, unless the periscope is unduly enlarged, and where it is difficult to utilize any other form of compass than a magnetic compass, and have mounted the compass within the vessel, the compass being embodied in the periscope above the eye-piece. By this construction the compass is close to the under side of the roof of the operating compartment of the vessel where it is above the head room of the compartment and consequently in a position not to interfere with any of the apparatus necessarily installed in the limited space of the compartment.

The arrangement of the compass of my improved structure also permits the use of a repeater compass operating in synchronism with the main gyroscopic compass by which the boat is directed to thereby avoid inaccuracies in calculations which would result from discrepancies in the readings of the magnetic compass compared with the main compass, due to magnetic influences of the hull of the boat or other causes which make the gyroscopic compass preferable for boats of this character.

My improved structure also embodies an arrangement whereby the repeater compass may be attached to a rotatable periscope and its card will be given a corrective rotation corresponding with the rotation of the periscope independently of the boat so that the reading through the periscope will correctly indicate the direction of the observed object from the boat without regard to the direction of the center line of the boat, and whether or not the optical axis of the periscope corresponds with the center line of the boat.

In the accompanying drawing, showing a preferred embodiment,

Figure 1 is a view, partially in elevation and partially in section, disclosing a rotatable periscope tube equipped with a repeater gyroscopic compass;

Fig. 2 is a diagram of the optical system comprising prisms and lenses;

Fig. 3 is an illustration of the graduated scale of the compass card of the repeater compass;

Fig. 4 shows the associated images of the observed objects in the field of view and of a portion of the graduated compass scale;

Figure 6:
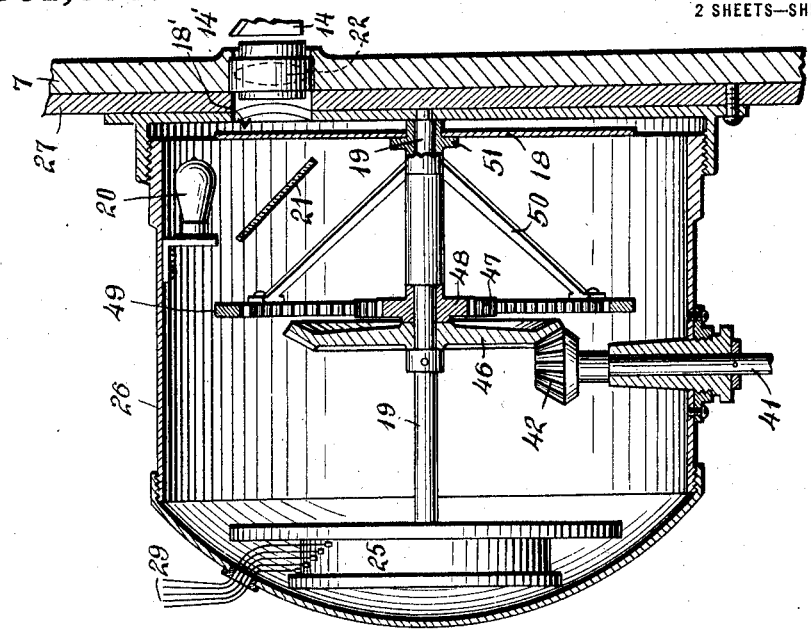
Fig. 6 is a sectional view taken on the line 6—6 of Fig. 5.

Reference now being had to Figs. 1 and 2, the periscope includes a tube 7 to which is secured at 8 a hood 9 provided with a suitable light inlet 10. The light from the observed objects within the field of view enters at the inlet 10, and passes through a lens 11 and into a prism 12. The light thus received interiorly of the tube is reflected from said prism and passes down the tube. A part of this light, that is such part (Fig. 2) as is not intercepted by an opaque screen 14' which backs the compass card's prism 14, enters a prism 15 and is reflected therefrom to pass through a lens 16 and thus be observed at an eye-piece 17.

The compass card 18 is preferably of translucent material and is supported with its actuating mechanism in a casing 26 attached to the side of the periscope tube between the eye-piece 17 and roof 7$^b$ of the operating compartment. The compass card is rotatable in a vertical plane close to the outer face of the wall of the periscope tube adjacent the prism 14. The upper portion of the edge of the compass card carrying the azimuth scale passes between a reflector 21 and a lens 22 in the wall of the periscope and coöperating with the prism 14, so that light rays from an illuminating bulb 20 will pass through a portion of the compass scale and lens 22 and enter prism 14 to be deflected by said prism and pass down the tube, the image of said scale, as diagrammatically indicated in Fig. 2, taking the place of the portion of light from prism 12 intercepted by the screen 14'. By this arrangement a composite image of the field of view and of the appropriate graduations which on said scale correspond to the bearing of a particular object in said field, will be transmitted to the eye-piece of the periscope. The cross-hairs 23 and 24 may be fixed within the tube 7 as indicated in Fig. 1.

The cross-hair 23 is laid upon any desired object in the field of view by training the vessel or by rotating the periscope through any suitable means.

The periscope tube 7 has fixed to it an inner optical tube 7$^a$ as shown in Fig. 1, for suitably supporting various of the optical elements provided as described to produce the desired composite image. The lens 22, however, is mounted in the tube 7, adjacent the face of the prism 14 which is set in the wall of the optical tube and is so positioned and proportioned that the light passing through it from the compass card is brought to a focus at the eye-piece of the periscope in the same plane as the light from the distant objects in the field of view of the periscope.

By the arrangement described the field of view and the compass card are observed through two separate objectives, the field of view through the objective prism 12 and the compass card through the auxiliary objective prism 14. Furthermore, the system of light rays coming from the field of view and the system of light rays coming from the compass card have, as viewed through the eye-piece, parallel axes so that they appear to lie in the same direction, and the field of view, the compass card and the cross-hairs together form a composite view shown in Fig. 4.

The compass card is operated by a repeater compass 25 mounted in the casing 26 which is fixedly attached to a sleeve 27 keyed on the periscope tube 7 at 28.

The compass mechanism which is not shown but is of usual construction, operates its shaft 19 in synchronism with the master compass of the boat and if the periscope were fixed to the hull of the boat with its optical axis coinciding with the center line of the boat the compass card could be fixed to the shaft 19 with its vertical graduations corresponding to the center line graduations of the master-compass. My invention, however, contemplates the application of the compass to a rotatable periscope whereby the direction of the object viewed through the periscope is obtained by merely rotating the periscope without turning the boat, and therefore, means are provided for rotating the compass card independently of the compass shaft to an extent necessary to compensate for the angular deviation of the optical plane of the periscope from the center line of the boat.

This means in the construction shown comprises a suitable differential mechanism for operating the compass card, the differential mechanism being of course partially governed by rotations of the periscope relatively to the boat and partially governed by rotations of shaft 19 as the latter is driven directly from the repeater 25.

The periscope tube 7 is mounted for rotation (Fig. 1) on a ball-bearing including a supporting sleeve 34 bolted to a fixed bracket 35, a lower race-ring 36, an upper race-ring 37 and a spacing ring 38 locked to the same key 28 which locks together sleeve 27 and the periscope tube 7.

Figure 5:
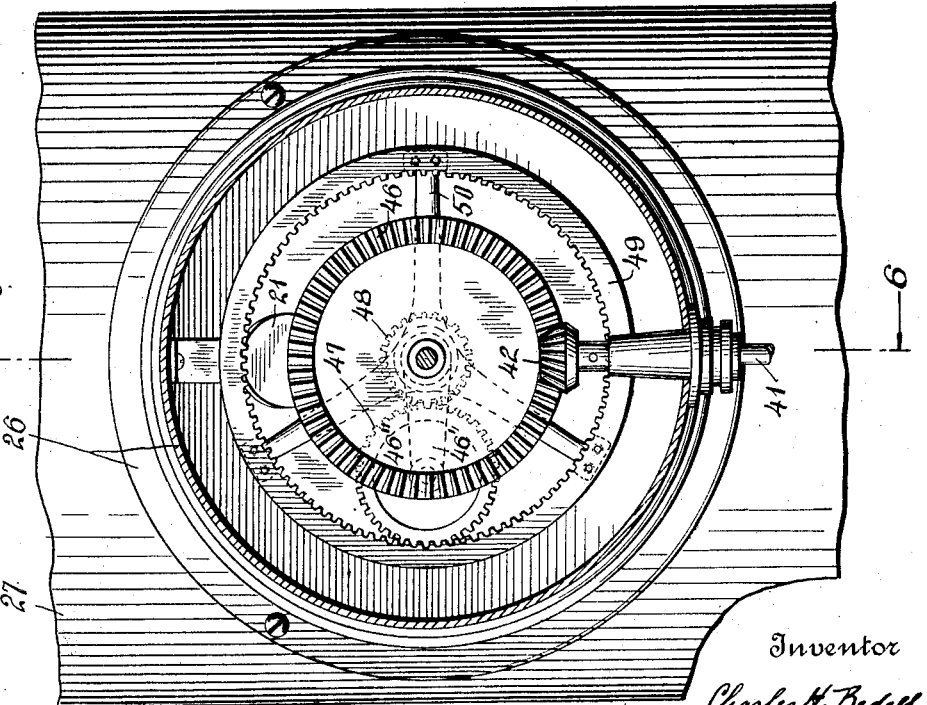
Fig. 5 is an enlarged detail sectional view, taken on the line 5—5 of Fig. 1.

A ring-gear 39 is fastened to the fixed supporting sleeve 34 for operating one driving part of the differential mechanism; meshing with gear 39 is a gear 40 fixed on the lower end of a vertical shaft 41 journaled in casing 26, as shown in Fig. 1. Referring now to Figs. 5 and 6, the upper end of shaft 41 carries for rotation therewith a beveled gear 42 meshing with a beveled gear 46 loosely mounted on the shaft 19 and provided on its face away from the pinion 42 with a shaft 46'' indicated in dotted lines in Fig. 5. This shaft supports a spur gear 47 which meshes with a pinion 48 attached to the shaft 19 and with an outer internal gear ring 49 carried by three inclined spokes 50 projecting from a hub 51 loose on the shaft 19 and supporting the compass card 18. The shaft 46'' may be supported at its outer end by an arm 46' projectng from a hub on the shaft 19 beyond the pinion 48.

The pinion 48, gear 47 and gear ring 49 form a differential gear whereby the movement of the internal gear ring 49 will be the resultant of the movement of the shaft 19 of the repeater and shaft 41 which is actuated by the periscope movement.

The repeater compass 25 is operated in the usual manner through the five wires 29, and where a rotatable periscope of the design illustrated is employed the casing 26 and the repeater compass 25 must bodily move as the periscope rotates. To permit this the five wires 29 are preferably connected to five annular conductors 30 anchored in an insulating ring 31 keyed at 32 on the sleeve 27 which supports the casing. A separate brush 30' for each of the conductors 30 is suitably mounted on some fixed support, the wires 33 connected to said brushes leading back to the master gyroscopic compass.

The operation of the mechanism just described is substantially as follows: Let it be assumed that periscope and boat are both heading in the same direction, say north, and the distant master compass has set the repeater 25 to give angular adjustment to the 0-point on the compass card 18 opposite the prism 14. If the boat, with the periscope tube moving therewith, is swung in azimuth, the compass card 18 will be properly rotated solely from the shaft 19 through the gear 48, the pinion 47 rotating on its shaft now held in fixed position by the gear 46. The instant, however, the periscope tube is moved relatively to the boat, the pinion 46 will be rotated and the pinion 47, whether rotating about its shaft 46'' or not, will act as a planetary gear, rotating the ring gear 49 and thus making the proper correction in the scale reading opposite prism 14 required by the angular adjustment of the periscope relatively to the boat. For instance, if the periscope be held trained on the object while the boat is turning, the rotation of the differential pinion 47 around its shaft as effected by the rotation of the compass-shaft will be exactly equalled by the bodily rotation of the pinion 46 in the opposite direction produced by the rotation of the periscope through the fixed gear 39, shaft 41 etc., so that ring-gear 49 will not be rotated and the position of the compass card will be unchanged.

It is apparent that the construction herein described may be modified in many details without departing from the essential features of my invention. The system of prisms and lenses may be modified in any well known manner; and the light inlets or the substitutes therefor may be arranged in any other relation. The construction of the differential gearing may also be variously modified.

It will be observed that in the preferred embodiment of the invention described the compass is compactly mounted beyond the lateral bounds of the periscope tube and below the roof wall of the vessel where it is most conveniently accessible for repairs, and is in the part of the operating compartment above the head room of the compartment and peculiarly available for accommodating the path of movement of the casing, all without substantially enlarging the tube or at all enlarging the portion of the tube which projects above the submarine.

I claim:

1. A periscope tube containing an optical system for observing objects within the field of view, in combination with a compass having a graduated compass card arranged adjacent the periscope tube between the objective and the ocular portions thereof, means for illuminating the compass card, and suitable light deflecting means adapted to produce an image of a part only of the compass scale in conjunction with the image of said objects.

2. A periscope tube containing an optical system for observing objects within the field of view, in combination with a compass having a graduated compass card arranged in a vertical plane and between the objective and the ocular portions of the tube, means for illuminating the compass card, and suitable light deflecting means adapted to produce an image of a part only of the compass scale in conjunction with the image of said objects.

3. A periscope tube containing an optical system for observing objects within the field of view, in combination with a compass having a graduated compass card arranged in a vertical plane and between the objective and the ocular portions of the tube, means for illuminating the compass card, and suitable light deflecting means adapted to produce an image of said objects in conjunction with the image of that portion of the compass scale which lies between the periphery of the compass card and a plane perpendicular to the axis of the periscope and cutting the compass card adjacent its center of rotation.

4. A periscope tube containing an optical system for observing objects within the field of view, in combination with a compass having a graduated compass card arranged in a vertical plane and between the objective and the ocular portions of the tube, means for illuminating the compass card, and suitable light deflecting means adapted to produce an image of said objects in combination with the image of that portion of the compass scale which lies between a peripheral portion of the compass card and a plane perpendicular to the axis of the periscope and cutting the compass card between its center of rotation and said peripheral portion.

5. A periscope tube having a compass with a graduated compass card intermediate the length of the tube, means for illuminating the compass card, and a suitable optical system for producing a visible image of a portion of the compass card.

6. A periscope tube having a compass with a graduated compass card intermediate the length of the tube, means for illuminating the compass card, and a suitable optical system for producing at the lower end of the tube an image of the compass card.

7. A periscope tube for use in a submarine boat and having a compass with a graduated compass card intermediate the ends of the tube and below the hull of the boat, means for illuminating the compass card, and a suitable optical system for producing at the lower end of the tube an image of the compass card.

8. A periscope tube having a compass with a graduated compass card arranged adjacent the tube and movable in a path about the axis of the tube, and a suitable optical system for producing a composite image partially composed of a portion of the compass card and partially composed of a portion of an image of the field of view of the periscope's objective.

9. A periscope tube having a compass with a graduated compass card arranged adjacent the tube and rotatable in a path about the axis of the tube and located between the top and bottom of the periscope, and a suitable optical system for producing a composite image partially composed of a portion of the compass card and partially composed of a portion of an image of the field of view of the periscope's objective.

10. A periscope having an ocular and an objective adapted to be directed to a field of view, in combination with a vertically arranged compass card, means to maintain said compass card oriented, and a second objective focused upon said compass card, said second objective being located below the periscope's objective and above the periscope's ocular, the fields of the two objectives being together visible at the ocular.

11. A periscope having an eye-piece and an objective adapted to be directed to a field of view, in combination with a compass card located below said objective, means to maintain said compass card oriented, a second objective focused upon said compass card, said second objective being located in said tube below the main objective and above the ocular of the periscope and alongside the compass-card, and a light deflecting element screening a part of the rays from the field of view and deflecting into the place thereof rays from the compass card.

12. A periscope including a tube having an ocular and an objective adapted to be directed to a field of view, in combination with a compass card, said compass card being arranged in a vertical plane and located adjacent said tube and below the main objective and above the ocular of the periscope, an objective arranged adjacent said compass card, the fields of the two objectives being together visible at the ocular.

13. A periscope including a tube having an eye-piece and an objective adapted to be directed to a field of view, in combination with a compass card, means to maintain said compass card oriented, a second objective focused upon said compass card, said compass card being arranged in a vertical plane and located adjacent said tube and below the main objective and above the ocular of the periscope, a second objective focused upon said compass card, said second objective being located in said tube below the main objective and above the ocular of the periscope, and a light reflecting element screening part of the rays from the field of view and deflecting into the place thereof rays from the compass card.

14. A periscope having an ocular and an objective adapted to be directed to a field of view, in combination with a compass card arranged alongside the tube and above the ocular, means to maintain said compass card oriented and including an actuator controlled from a distant point, and a second objective for the said compass card, the fields of the two objectives being together visible at the ocular.

15. A periscope having an ocular and an objective adapted to be directed to a field of view, in combination with a compass card, means to maintain said compass card oriented and including a repeater gyroscopic compass, and a second objective for the said compass card, said second objective being located below the periscope's objective and above the periscope's ocular and said compass card being arranged alongside the tube and opposite the second objective, the fields of the two objectives being together visible at the ocular.

16. A rotatable periscope installed in a submarine boat and having an ocular and an objective adapted to be directed to a field of view, in combination with a compass card, said compass card being arranged below the periscope's objective and above the periscope's ocular, a second objective for the compass card, said second objective being arranged below the periscope's objective and above the periscope's ocular, the fields of the two objectives being together visible at the ocular, electrical means to rotate said compass card in synchronism with changes of the center-line of the boat in azimuth, and mechanical means to correct such rotation of the compass card so that the correction corresponds to any rotation of the periscope relatively to the boat.

17. A rotatable periscope installed in a submarine boat and having an ocular and an objective adapted to be directed to a field of view, in combination with a compass card the axis of rotation of which is perpendicular to the axis of rotation of the periscope, means to rotate said compass card in synchronism with changes in the center-line of the boat in azimuth, means to rotate the compass card in synchronism with the rotation of the periscope relatively to the boat, and a second objective for the compass card, said second objective being located below the periscope's objective and above the periscope's ocular, the fields of the two objectives being together visible at the ocular.

In testimony whereof I affix my signature.

CHARLES H. BEDELL.